April 18, 1933. J. G. GARRITY ET AL 1,904,784
ELECTRIC AUTOMATIC RECORDING SCALE
Filed Dec. 22, 1931 4 Sheets-Sheet 1
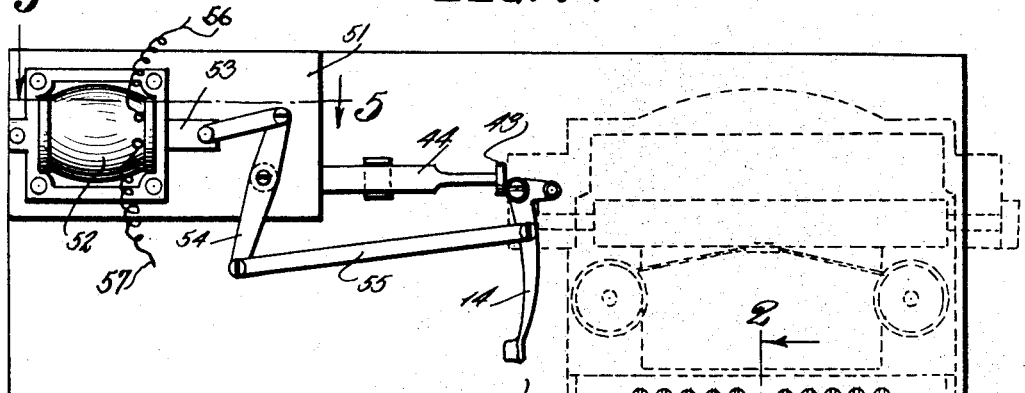
Fig. 1.
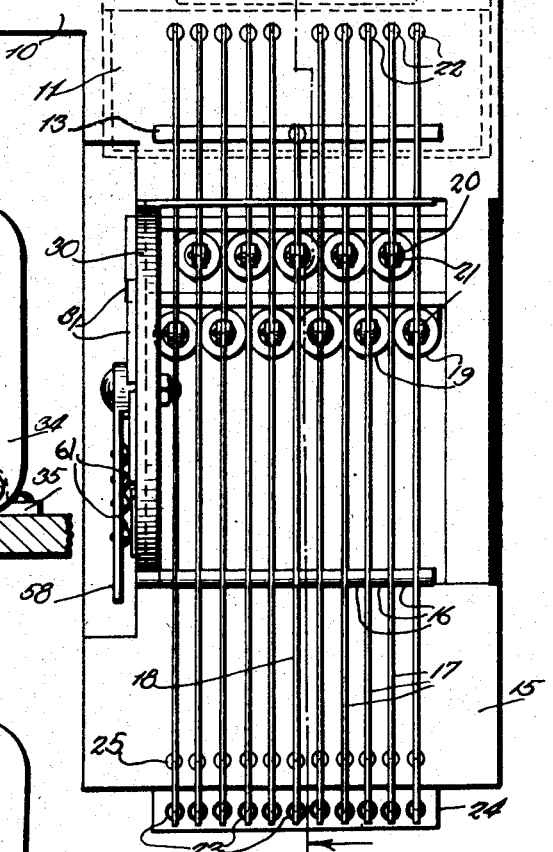
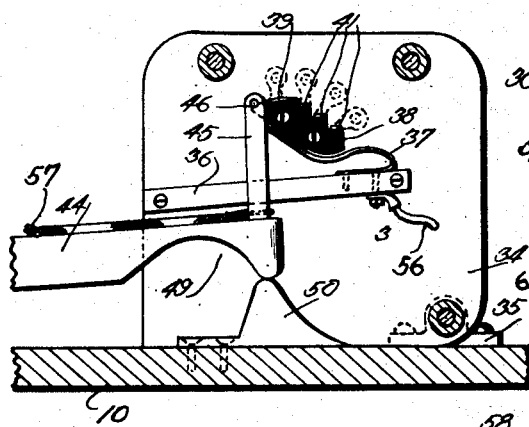
Fig. 5.
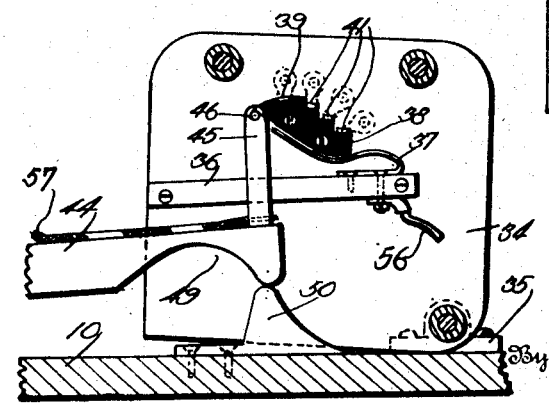
Fig. 6.
Inventors
John G. Garrity &
Edward L. McCarthy.
Attorney April 18, 1933. J. G. GARRITY ET AL 1,904,784
ELECTRIC AUTOMATIC RECORDING SCALE
Filed Dec. 22, 1931 4 Sheets-Sheet 2
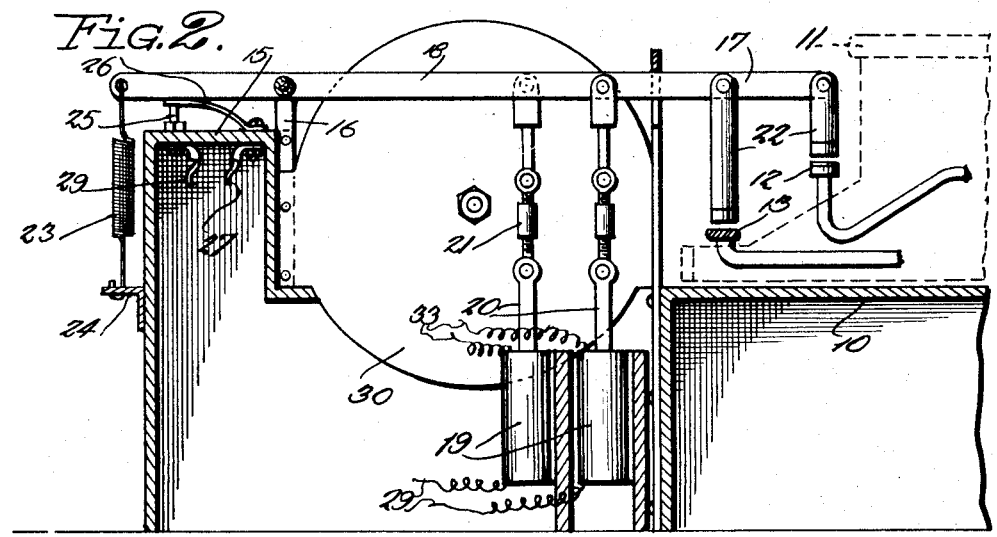
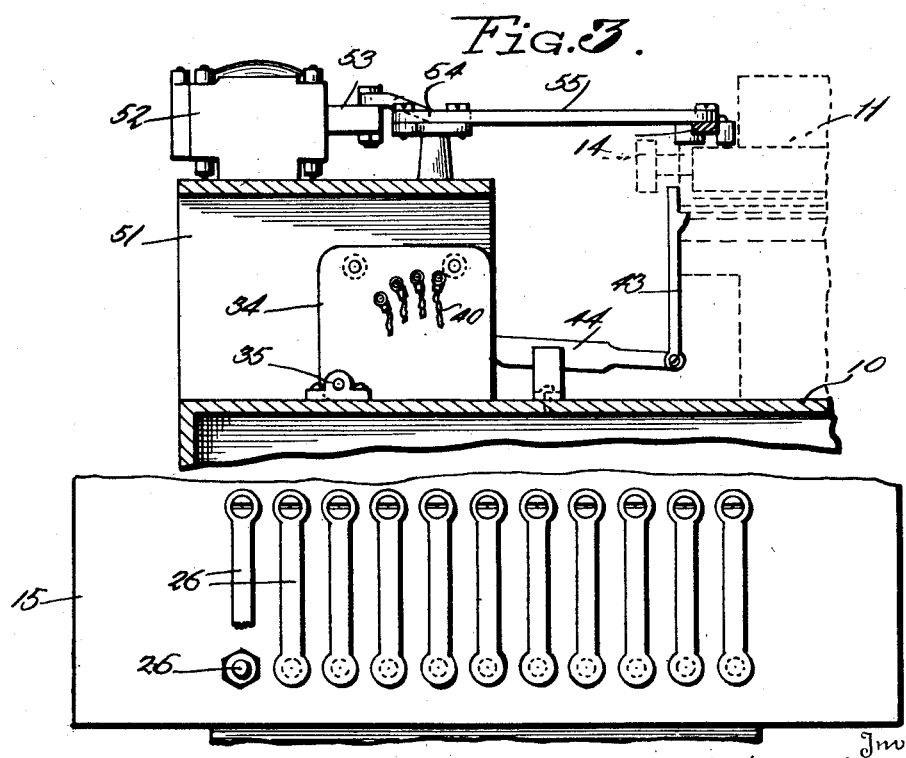
Inventors
John G. Garrity &
Edward L. McCarthy.

April 18, 1933.  J. G. GARRITY ET AL  1,904,784
ELECTRIC AUTOMATIC RECORDING SCALE
Filed Dec. 22, 1931  4 Sheets-Sheet 3
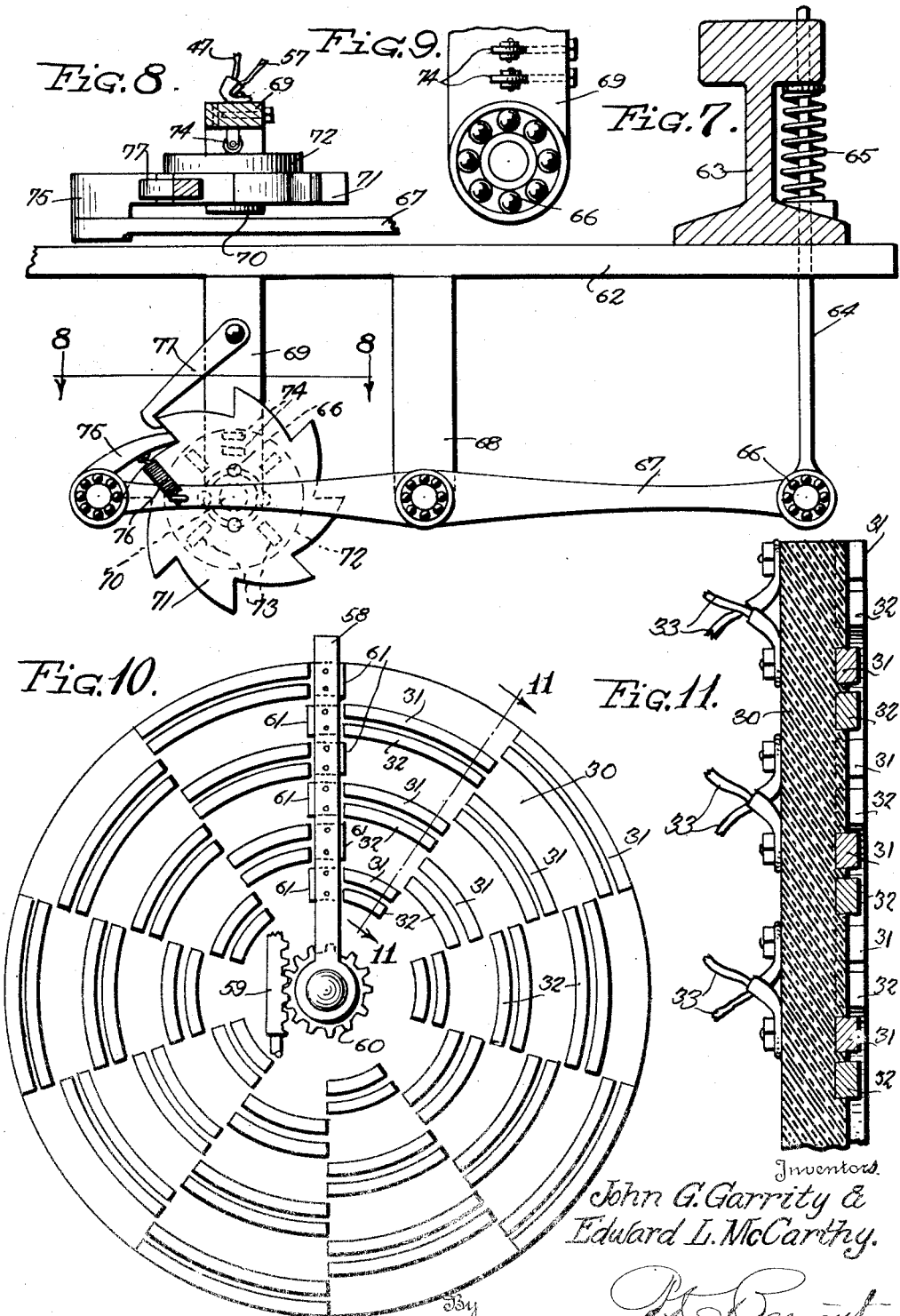
Inventors
John G. Garrity &
Edward L. McCarthy.

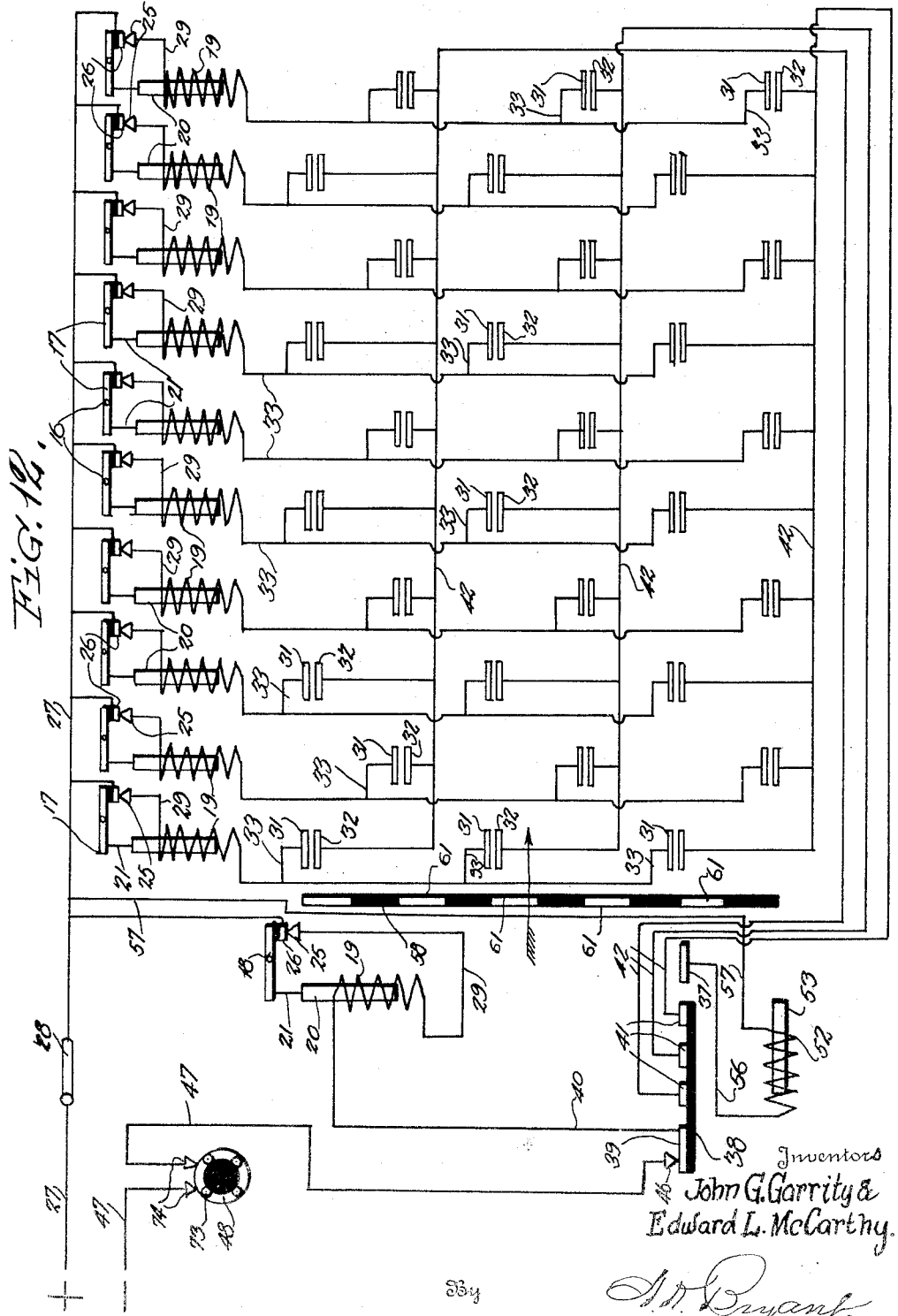

Patented Apr. 18, 1933

1,904,784

UNITED STATES PATENT OFFICE

JOHN G. GARRITY AND EDWARD L. McCARTHY, OF PITTSBURGH, PENNSYLVANIA

ELECTRIC AUTOMATIC RECORDING SCALE

Application filed December 22, 1931. Serial No. 582,670.

This invention relates to weight recording devices and has special reference to a device for recording the weights of cars as they move over an ordinary car scale platform.

In the weighing of loaded cars, as for instance, coal mine cars in a train, it is frequently desirable to record the weights of such cars automatically at a point well removed from the weighing scales such as the mine office.

One important object of this invention is to provide a novel and highly efficient apparatus, by which such car weights may be automatically recorded at a point remote from the weighing scales.

A second important object of the invention is to provide a novel device of this character wherein the recording is performed on a paper roll or strip by means of an ordinary typewriter.

A third important object of the invention is to provide an improved electrical apparatus controlled by the weight on a scale and arranged to so actuate the number keys of a typewriter as to effect recording of the weight on such scale.

A fourth important object of the invention is to provide a novel arrangement for causing actuation of the proper keys in succession in such a device.

A fifth important object of the invention is to provide a novel means to ensure the return of the typewriter carriage and rotation of the typewriter platen roll upon the completion of each weighing.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a plan view of the invention;

Figure 2 is a detail section on the line 2—2 of Figure 1;

Figure 3 is a front elevation, partly in section, and showing the carriage return device and the change over mechanism for successively bringing certain key operating solenoids into circuit;

Figure 4 is an enlarged plan view of a certain bank of circuit breakers used herein;

Figure 5 is an enlarged detail section on the line 5—5 of Figure 1 but showing only the change over mechanism, the mechanism being shown in the position occupied at the start of recording a weight;

Figure 6 is a view similar to Figure 5 but showing the position of the parts just as the mechanism has completed its operation and is about to be restored to normal position;

Figure 7 is an elevation of certain circuit closing mechanism actuated by the movement of a car over a certain part of one of the rails supporting such car;

Figure 8 is a section on the line 8—8 of Figure 7;

Figure 9 is a detail view, to an enlarged scale, showing in elevation certain contact rollers associated with the parts shown in Figure 8;

Figure 10 is a face view of a certain contact plate used herein;

Figure 11 is an enlarged section on the line 11—11 of Figure 10;

Figure 12 is a wiring diagram showing the electrical connections for the invention.

In the embodiment of the invention herein disclosed, there is shown a stand or support having a platform 10 at one end and on this platform is mounted any ordinary typewriter 11 having a bank of ten number keys 12 and a spacing bar 13. The typewriter mechanism does not itself in its entirety constitute any special part of the invention and, to avoid confusion only those parts having a direct relation to the present invention are shown in full lines, the remainder being shown in dotted lines. At the same time, it is to be understood that some form of typewriter having the desired keys, spacer bar and platen rotating lever 14 is necessary to the operation of recording the weights and thus such typewriter, as a whole, does form part of the mechanism essential to carrying the invention into execution. The other or rear end of the base or support is likewise provided with a raised platform 15, somewhat higher than the platform 10. Extending up from the platform 15 at the rear edge thereof is a series of spaced brackets 16. Number levers 17 and a spacer lever 18 are positioned between these brackets and extend both to the front and to the rear thereof, these levers being pivoted to the brackets. A solenoid 19 having a core 20 is located beneath each of these levers adjacent the platform 10 and each core is connected to a respective lever by a turnbuckle 21 so that the cores may be adjusted with respect to the solenoids. Each of the levers carries on its forward end a downwardly extending hammer 22, the hammers of the levers 17 being alined over the respective number keys 12 while the hammer of the lever 18 is alined over the spacer bar 13. Springs 23 connect the rear ends of the levers with a bracket 24 fixed to the rear of the support and hold the hammers normally raised slightly above the keys and spacer bar.

On the platform 15 is mounted a bank of circuit breakers each consisting of a fixed contact 25 and a spring contact 26 tending to move away from the respective fixed contact but held in engagement therewith by the action of the respective lever 17 or 18. These contacts are, of course, insulatedly mounted and the contacts 26 are connected in multiple to a line supply wire 27 wherein is interposed a control switch 28 by which current may be cut off the apparatus when desired. Each respective contact 25 is connected to one terminal of a respective solenoid 19 by a wire 29.

Fixed to the support is a disk 30 of suitable insulating material on the front face of which is mounted a series of sets of pairs of arcuate contact strips, each set of pairs forming a sector of this contact device. These strips are all of the same angular length and, in the form here shown, there are ten sets or segments and each set has three pairs of strips. Further, these trips are arranged in radially staggered rows so that there are three rows each of ten pairs of strips. It is here to be understood that the number of sets and the number of rows have been arbitrarily chosen for the sake of convenience in illustrating both the construction and the wiring and the invention is not in any way restricted to the number of sets or number of rows. It may be remarked, however, that each row corresponds to a definite integral place in the number to be recorded, the inner row representing units, the next row tens, the next hundreds and so on. Each pair of these contacts consists of an outer member 31 and an inner member 32. The outer contacts 31 of each set are connected in multiple through a wire 33 to the remaining terminal of one of the ten number pointing solenoids 19.

At the left of the typewriter there is provided a square cage 34 and bearings 35 pivot this cage or housing by the corner remote from the typewriter to the platform 10. A shelf 36 extends partly across this housing from the rear wall thereof and carries a spring contact member 37 above which is an insulating block 38 mounted on the front side or wall housing 34. The upper face of this block 38 is stepped downwardly from the end adjacent the typewriter and in the tread portion of the upper step there is fixed a contact 39 which is connected by a wire 40 with the remaining end of the solenoid 19 which controls the spacer bar lever 18. The remainder of the steps equal in number the rows of pairs of contacts 31 and 32, as here shown there being three of such steps. Each step carries on its tread portion a contact 41 to which is connected in multiple, by a wire 42, the several contacts 32 of a respective row. Fixed to the carriage of the typewriter rigidly is a depending bracket 43 to which is pivoted one end of a contact carrying bar 44. This bar carries at its free end a standard 45 and a contact pin 46 projects from this standard across the space around the block 38 and contact 37, this pin normally resting on the contact 39. This pin 46 is connected to the remaining line wire 47 through a track switch indicated in Figure 12 in general at 48 and which is fully shown in Figures 7 to 9 and will be hereinafter particularly described. The bar 44 has the under side of its free end hollowed out as at 49 so that it may ride over a cam 50 fixed in the housing 34 to the platform 10. Obviously, with this construction, as the typewriter carriage travels to the left the pin 46 will likewise move to the left as one faces the typewriter and will drop in succession on the contacts 41. The spacing of these contacts laterally just equals the spatial movement of the carriage as a key is struck. Extending over the housing 34 is a housing 51 on which is supported a solenoid 52 having a core 53. This core has a pivotal link connection with a lever 54 pivoted intermediate its ends to the housing 51 and having its other end connected by a link 55 with the platen shift lever 14 of the typewriter. Thus, as the typewriter carriage moves to the left the core will be drawn out but upon energization of the solenoid 52 the core will be drawn in, the carriage moved to the right and the platen roll shifted for a new line as is common in typewriters.

One terminal of the solenoid 52 is connected by a wire 56 with the spring contact 37 and the other terminal of said solenoid is connected by a wire 57 with the line wire 27. Thus, when the pin 46 drops off the last step after completing the number it will engage the contact 37 and restore the typewriter carriage to normal position at the right through the action of the solenoid 52. When the pin 46 drops on this contact 37 the contact will be slightly depressed so that, as the carriage moves back and the bar 44 moves back with it, the pin 46 passes beneath the block 38, slightly tilting the housing 34 as it does so, until it clears the right end of the block 38 whereupon the housing 34 drops back so that the pin again takes its normal position. This action is well shown in Figures 5 and 6.

Pivoted centrally of the disk 30 is an arm 58 of insulating material which swings over the disk to a position regulated by the weight imposed on the scale. Since the scale itself forms no part of the present invention it is deemed unnecessary either to show or describe the same since any ordinary and well known track scale may be used. Moreover, since the specific mechanism for moving the arm 58 will depend on the particular scale used and also forms no part of this invention it is thought necessary only to indicate a typical form of mechanism for such purpose and this is here shown as a rack bar 59 having its longitudinal movement controlled by the weight on the scale and a gear 60 carrying the arm 58 and in mesh with said rack-bar. In other words, the arm 58 simply forms the hand of a fixed dial scale and is caused to traverse the dial by any well known means such as are common in scales. On the under side of the arm 58 is a series of bridging contacts 61 each designed to bridge pairs of the contacts 31 and 32, there being two contacts 61 for each row of said pairs so that one of the two contacts 61 will bridge the outer pairs of such row while the other bridges the staggered inner members of such row. Thus, the pairs of the row are successively bridged as the arm sweeps over the disk. In order to prevent the bridging of the two pairs of contacts 31 and 32 in the same row at the same time the pairs of contacts in the row are arranged alternatively in different planes parallel to the face of the disk and the contacts 61 all lie in the same plane. Thus, as a contact 61 passes off of a high pair of contacts 31 and 32, the complementary contact 61 for the row will be held clear of the succeeding low contacts 31 and 32 until the first contact 61 is clear of the high contacts. Similarly, in passing from a low to a high pair of contacts 31 and 32 the arm contact 61 will be lifted off of the low pair as soon as the complementary contact 61 engages the high pair. It is to be noted that the contacts 61 are normally out of contact with all of the pairs 31 and 32, suitable spacing being provided for this as shown in Figure 10.

Considering now the track circuit closer shown in Figures 7 to 9 it will be seen that in Figure 7 there is illustrated a portion of a scale platform 62 and one of the rails 63. Through the rail extends a plunger 64 which is normally held raised by a spring 65. The lower end of this plunger is pivoted by a ball bearing 66 to one arm of a ratchet lever 67 pivoted intermediate its ends to a hanger 68 depending from the scale platform. A bracket 69 depends from the scale platform at one side of and adjacent the remaining end of the lever 67. A shaft 70 is carried by the lower end of the bracket 69 and supports an eight toothed ratchet wheel 71 carrying a concentric insulating disk 72 having four bridging contacts 73 set in its face at 90° apart. On the standard 69 is carried a pair of roller contacts 74 which are normally positioned half-way between successive contacts 73. The free end of the lever 67 carries an actuating pawl 75 which is held in contact with the ratchet by a spring 76. A locking or restraining pawl 77 is pivoted to the bracket 69 and also engages the ratchet to prevent accidental reverse movement thereof.

Prior to describing the operation of the invention it is well to remember that the arrangement of the pairs of contacts 31 and 32 as here shown as well as the wiring to the solenoids may be varied without departing from the inventive ideal. For instance, a disk might be used having ten segments for its inner row, one hundred for the next and so on. In such a case the wiring would be correspondingly varied, the first segment of each group of ten, no matter in what row they lie being connected to the solenoid controlling the *o* key, the next segment in each group being connected to the solenoid controlling the *l* key and so forth.

As a car runs onto the scale platform one of the first pair of wheels depresses the plunger 64 which effects rotation of the disk 72 to bring one of the contacts 74 which have respective parts of the line wire 47 connected to them. At this time the pin 46 rests on the contact 39. Current will flow from the line wire 27 through contact 26 of the lever 18, contact 25, wire 29, solenoid 19, wire 40, contact 39, pin 46 to the line wire 47. The solenoid 19 being energized, the lever 18 will be moved to actuate the spacer bar and as it moves the circuit will be opened at the contacts 25 and 26. The typewriter carriage will move one space to the left and, if the contact 39 is of sufficient length, the circuit will be again closed at the contacts 25 and 26 and the lever 18 will act to cause movement of the carriage a second space to the left. Dependent on the length of the contact 39 the carriage may be caused to move as many spaces as desired. The pin now drops onto the first contact 41. Meanwhile the arm 58 has moved to a position on the dial controlled by the weight on the scale. With the pin on the first contact 41 the first row of contacts 32 will be energized so that current will now flow from wire 27 to contact 26 of that one of the levers 17 corresponding to the pair of contacts in the first row bridged by a contact 61, and thence to contact 25, contact 31 of the bridged pair, contact 32, wire 42, contact 41 and pin 46 to wire 47. This will cause actuation of the proper key and simultaneously, by reason of the spacing arrangement of the typewriter, will cause the pin 46 to pass to the next contact 41 whereupon the operation just described is repeated. This continues for each digit until the printing has been completed whereupon the pin 46 drops onto the contact 37 which causes energization of the solenoid 52 and restoration of the parts to normal position. As the parts are restored to normal position, a wheel of the second pair on the car passes over and depresses the plunger 64 which rotates the disk 72 to break the circuit at the track switch so that no further operation of the typewriter occurs until another car runs onto the scale.

There has thus been provided a simple and efficient device of the kind described and for the purpose specified.

It is obvious that many changes may be made in the form, proportions and construction of the invention without departing from the material principles involved. It is not, therefore, desired to confine the invention to the exact form herein shown and described, but it is desired to include all such as come within the scope of the appended claims.

What is claimed as new is:—

1. Apparatus to record car scale weights by a typewriter having number keys, a spacer bar, a carriage and platen roll, and means for actuating the latter, said apparatus including an electro-magnetic key actuating means for each number key, a series of circuit closing contacts each associated in circuit with a respective one of said electro-magnetic means, and means controlled by the weight on a scale for closing a circuit through a corresponding contact and its associated electro-magnetic means.

2. Apparatus to record car scale weights by a typewriter having number keys, a spacer bar, a carriage and platen roll, and means for actuating the latter, said apparatus including an electro-magnetic key actuating means for each number key, a series of circuit closing contacts each associated in circuit with a respective one of said electro-magnetic means, means controlled by the weight on a scale for closing a circuit through a corresponding contact and its associated electro-magnetic means, and other means for opening the closed circuit immediately after the closing thereof.

3. Apparatus to record car scale weights by a typewriter having number keys, a spacer bar, a carriage and platen roll, and means for actuating the latter, said apparatus including an electro-magnetic actuating means for each of said keys, a plurality of series of circuit closing contacts the respective contacts of each series being associated in circuit with respective key actuating electro-magnetic means, means to initiate the closing of the circuits through each contact of a series in multiple, the last mentioned means being arranged to successively initiate the closing of circuits through the several series, and means controlled by the weight on a scale for closing a circuit through a respective contact of each series and its associated electro-magnetic means.

4. Apparatus to record car scale weights by a typewriter having number keys, a spacer bar, a carriage and platen roll, and means for actuating the latter, said apparatus including an electro-magnetic actuating means for each of said keys, a plurality of series of circuit closing contacts the respective contacts of each series being associated in circuit with respective key actuating electro-magnetic means, means to initiate the closing of the circuits through each contact of a series in multiple, the last mentioned means being arranged to successively initiate the closing of circuits through the several series, means controlled by the weight on a scale for closing a circuit through a respective contact of each series and its associated electro-magnetic means, and other means for opening the circuit through each electro-magnetic means immediately after the same has been closed.

5. Apparatus to record car scale weights by a typewriter having number keys, a spacer bar, a carriage and platen roll, and means for actuating the latter, said apparatus including an electro-magnetic actuating means for each of said keys, and a spacer bar, a plurality of series of circuit closing contacts the respective contacts of each series being associated in circuit with respective key actuating electro-magnetic means, a further contact associated with the presser bar actuating means, means to initiate the closing of the circuits through each contact of a series in multiple, the last mentioned means being arranged to successively close the circuit through the presser bar actuating means and initiate the closing of circuits through the several series, and means controlled by the weight on a scale for closing a circuit through a respective contact of each series and its associated electro-magnetic means.

6. Apparatus to record car scale weights by a typewriter having number keys, a spacer bar, a carriage and platen roll, and means for actuating the latter, said apparatus including an electro-magnetic actuating means for each of said keys and spacer bar, a plurality of series of circuit closing contacts the respective contacts of each series being associated in circuit with respective key actuating electro-magnetic means, a further contact associated with the presser bar actuating means, means to initiate the closing of the circuits through each contact of a series in multiple, the last mentioned means being arranged to successively close the circuit through the presser bar actuating means and initiate the closing of circuits through the several series, means controlled by the weight on a scale for closing a circuit through a respective contact of each series and its associated electro-magnetic means, and other means for opening the circuit through each electro-magnetic means immediately after the same has been closed.

7. Apparatus to record car scale weights by a typewriter having number keys, a spacer bar, a carriage and platen roll, and means for actuating the latter, said apparatus including an electro-magentic key actuating means for each number key, a series of circuit closing contacts each associated in circuit with a respective one of said electro-magnetic means, means controlled by the weight on a scale for closing a circuit through a corresponding contact and its associated electro-magnetic means, and a car controlled circuit closer having the foregoing circuit connections associated in multiple therewith.

8. Apparatus to record car scale weights by a typewriter having number keys, a spacer bar, a carriage and platen roll, and means for actuating the latter, said apparatus including an electro-magnetic actuating means for each of said keys, a plurality of series of circuit closing contacts the respective contacts of each series being associated in circuit with respective key actuating electro-magnetic means, means to initiate the closing of the circuits through each contact of a series in multiple, the last mentioned means being arranged to successively initiate the closing of circuits through the several series, means controlled by the weight on a scale for closing a circuit through a respective contact of each series and its associated electro-magnetic means, and a car controlled circuit closer having the foregoing circuit connections associated in multiple therewith.

9. Apparatus to record car scale weights by a typewriter having number keys, a spacer bar, a carriage and platen roll, and means for actuating the latter, said apparatus including an electro-magnetic actuating means for each of said keys, a plurality of series of circuit closing contacts the respective contacts of each series being associated in circuit with respective key actuating electro-magnetic means, means to initiate the closing of the circuits through each contact of a series in multiple, the last mentioned means being arranged to successively initiate the closing of circuits through the several series, means controlled by the weight on a scale for closing a circuit through a respective contact of each series and its associated electro-magnetic means, other means for opening the circuit through each electro-magnetic means immediately after the same has been closed, and a car controlled circuit closer having the foregoing circuit connections associated in multiple therewith.

10. Apparatus to record car scale weights by a typewriter having number keys, a spacer bar, a carriage and platen roll, and means for actuating the latter, said apparatus including an electro-magnetic actuating means for each of said keys and spacer bar, a plurality of series of circuit closing contacts the respective contacts of each series being associated in circuit with respective key actuating electro-magnetic means, a further contact associated with the presser bar actuating means, means to initiate the closing of the circuits through each contact of a series in multiple, the last mentioned means being arranged to successively close the circuit through the presser bar actuating means and initiate the closing of circuits through the several series, means controlled by the weight on a scale for closing a circuit through a respective contact of each series and its associated electro-magnetic means, and a car controlled circuit closer having the foregoing circuit connections associated in multiple therewith.

11. Apparatus to record car scale weights by a typewriter having number keys, a spacer bar, a carriage and platen roll, and means for actuating the latter, said apparatus including an electro-magnetic actuating means for each of said keys and spacer bar, a plurality of series of circuit closing contacts the respective contacts of each series being associated in circuit with respective key actuating electro-magnetic means, a further contact associated with the presser bar actuating means, means to initiate the closing of the circuits through each contact of a series in multiple, the last mentioned means being arranged to successively close the circuit through the presser bar actuating means and initiate the closing of circuits through the several series, means controlled by the weight on a scale for closing a circuit through a respective contact of each series and its associated electro-magnetic means, other means for opening the circuit through each electro-magnetic means immediately after the same has been closed, and a car controlled circuit closer having the foregoing circuit connections associated in multiple therewith.

12. Apparatus to record car scale weights by a typewriter having number keys, a spacer bar, a carriage and platen roll, and means for actuating the latter, said apparatus including an electro-magnetic key actuating means for each number key, a series of circuit closing contacts each associated in circuit with a respective one of said electro-magnetic means, means controlled by the weight on a scale for closing a circuit through a corresponding contact and its associated electro-magnetic means, a car controlled circuit closer having the foregoing circuit connections associated in multiple therewith, said car controlled circuit closer being arranged to close upon the passage of one wheel of a car thereover and to open upon passage of a second wheel of said car thereover.

13. Apparatus to record car scale weights by a typewriter having number keys, a spacer bar, a carriage and platen roll, and means for actuating the latter, said apparatus including an electro-magnetic key actuating means for each number key, a series of circuit closing contacts each associated in circuit with a respective one of said electro-magnetic means, means controlled by the weight on a scale for closing a circuit through a corresponding contact and its associated electro-magnetic means, other means for opening the closed circuit immediately after the closing thereof, and a car controlled circuit closer having the foregoing circuit connections associated in multiple therewith, said car controlled circuit closer being arranged to close upon the passage of one wheel of a car thereover and to open upon passage of a second wheel of said car thereover.

14. Apparatus to record car scale weights by a typewriter having number keys, a spacer bar, a carriage and platen roll, and means for actuating the latter, said apparatus including an electro-magnetic actuating means for each of said keys, a plurality of series of circuit closing contacts the respective contacts of each series being associated in circuit with respective key actuating electro-magnetic means, means to initiate the closing of the circuits through each contact of a series in multiple, the last mentioned means being arranged to successively initiate the closing of circuits through the several series, means controlled by the weight on a scale for closing a circuit through a respective contact of each series and its associated electro-magnetic means, and a car controlled circuit closer having the foregoing circuit connections associated in multiple therewith, said car controlled circuit closer being arranged to close upon the passage of one wheel of a car thereover and to open upon passage of a second wheel of said car thereover.

15. Apparatus to record car scale weights by a typewriter having number keys, a spacer bar, a carriage and platen roll, and means for actuating the latter, said apparatus including an electro-magnetic actuating means for each of said keys, a plurality of series of circuit closing contacts the respective contacts of each series being associated in circuit with respective key actuating electro-magnetic means, means to initiate the closing of the circuits through each contact of a series in multiple, the last mentioned means being arranged to successively initiate the closing of circuits through the several series, means controlled by the weight on a scale for closing a circuit through a respective contact of each series and its associated electro-magnetic means, other means for opening the circuit through each electro-magnetic means immediately after the same has been closed, and a car controlled circuit closer having the foregoing circuit connections associated in multiple therewith, said car controlled circuit closer being arranged to close upon the passage of one wheel of a car thereover and to open upon passage of a second wheel of said car thereover.

16. Apparatus to record car scale weights by a typewriter having number keys, a spacer bar, a carriage and platen roll, and means for actuating the latter, said apparatus including an electro-magnetic actuating means for each of said keys and spacer bar, a plurality of series of circuit closing contacts the respective contacts of each series being associated in circuit with respective key actuating electro-magnetic means, a further contact associated with the presser bar actuating means, means to initiate the closing of the circuits through each contact of a series in multiple, the last mentioned means being arranged to successively close the circuit through the presser bar actuating means and initiate the closing of circuits through the several series, means controlled by the weight on a scale for closing a circuit through a respective contact of each series and its associated electro-magnetic means, other means for opening the circuit through each electro-magnetic means immediately after the same has been closed, and a car controlled circuit closer having the foregoing circuit connections associated in multiple therewith, said car controlled circuit closer being arranged to close upon the passage of one wheel of a car thereover and to open upon passage of a second wheel of said car thereover.

In testimony whereof we affix our signatures.

JOHN G. GARRITY.
EDWARD L. McCARTHY.